(12) United States Patent
Camp

(10) Patent No.: US 6,763,430 B1
(45) Date of Patent: Jul. 13, 2004

(54) AUTOMATIC ACQUISITION OF PHYSICAL CHARACTERISTICS OF A HARD DRIVE

(75) Inventor: Claude Camp, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 108 days.

(21) Appl. No.: 09/664,879

(22) Filed: Sep. 19, 2000

(51) Int. Cl.⁷ .............................................. G06F 12/00
(52) U.S. Cl. ...................................... 711/112; 711/170
(58) Field of Search ................................. 711/112, 170

(56) References Cited

U.S. PATENT DOCUMENTS 6,237,070 B1 * 5/2001 Ng .............................. 711/167
6,253,279 B1 * 6/2001 Ng .............................. 711/107

* cited by examiner

Primary Examiner—Hiep T. Nguyen

(57) ABSTRACT

A data gathering program executing on a host computer acquires the physical characteristics of an arbitrary disk drive. A variety of physical parameters of the disk drive can thus be discovered by the host computer system, including platter rotation time, the number and size of each track, the skew of the tracks relative to one another, and head seek, settle, and setup times.

54 Claims, 7 Drawing Sheets

AUTOMATIC ACQUISITION OF PHYSICAL CHARACTERISTICS OF A HARD DRIVE

BACKGROUND OF THE INVENTION

1. Field of the Invention

The present invention relates generally to hard disk drives, and more particularly, to the optimization of hard disk drive performance.

2. Description of Background Information

Hard disk drives store information as magnetization patterns on magnetic media and are common components in today's personal computers. Typically, hard disk drives are the primary non-volatile storage location for both user data and software program data.

FIG. 1 is a diagram illustrating a conventional host computer system and its hard drive. Host computer system 12 includes fast access solid state memory 16, computer system bus 20, and CPU 18. Memory 16 is a solid-state semiconductor memory such as a dynamic random access memory (DRAM) that stores the data being manipulated by CPU 18. For example, memory 16 may store application code 22, operating system code 24, or user data 25. CPU 18 and memory 16 communicate with one another over bus 20.

Host computer 12 may read or write data from/to DRAM 16 to disk drive 10. Head or write commands from host computer 12 are received and interpreted by controller 26. Controller 26 controls spindle and actuator drivers 28 to read or write data to one or more magnetic platters in hard disk array (HDA) 30.

Conventionally, hard disk drive 10 hides certain of its internal characteristics from the host 12. For example, the physical layout of the disk's data tracks and the locations of defective data sectors are not known, and do not need to be known, by host 12. Instead, host 12, when reading or writing data with hard disk drive 10, simply specifies an address for the data (called a logical block address), and controller 26 of disk drive 10 converts the logical address to a physical specification on the hard drive, such as the appropriate platter, track, and sector of the hard disk array 30. Thus, host 12 may access the hard disk drive without having to concern itself with the internal characteristics of the hard disk drive. This can be beneficial as it allows hard disk drives to have different internal implementation as long as they present the correct interface to the host computer.

In certain situations, however, host computer 12, by knowing the internal state of disk drive 10, may be able to optimize commands to the disk drive. For example, if the host computer 12 knows how long it should take to execute each of a series of commands, the host computer may decide to first execute the one that will execute the fastest.

Additionally, if host computer 12 knows where the read heads of disk drive 10 will land when they are moved to the desired data track, the host computer may implement command reordering to reorganize a series of read commands so that they more efficiently coincide with the position of the read heads. In the absence of command reordering techniques, hard disk drive 10 executes commands in the order in which it receives them. The result is that the disk drive heads tend to randomly and inefficiently sweep over the surface of the hard disk platters. Command reordering techniques attempt to reorder the sequence of drive commands to minimize the random movement of the read/write head.

One way to implement techniques such as command reordering at the host computer level is to model physical parameters of the hard disk drive in the host computer and to optimize data requests to the hard drive based on the modeled physical parameters. Such a technique is discussed in U.S. Pat. No. 6,490,651, filed Mar. 14, 2000, and issued Dec. 3, 2002. This contents of this patent are hereby incorporated by reference.

In order to model the physical parameters of a hard disk drive, however, information about the basic physical characteristics of the hard drive, such as an accurate physical layout of the tracks and sectors on the drive, must first be gathered by the model. One way to gather such information is to have a skilled technician manually examine each disk drive. This method of gathering information, however, is labor intensive and is not suited for the general distribution of a generic disk drive model intended to model any disk drive.

Accordingly, there is a need in the art to be able to more efficiently gather information relating to the physical characteristics of a hard drive.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF AN THE ILLUSTRATED EMBODIMENTS

Reference will now be made in detail to embodiments of the invention, examples of which are illustrated in the accompanying drawings. Whenever possible, the same reference numbers will be used throughout the drawings to refer to the same or like parts.

As generally described herein, a data gathering program executing on a host computer acquires the physical characteristics of an arbitrary disk drive, such as an ATA drive.

Figure 1:
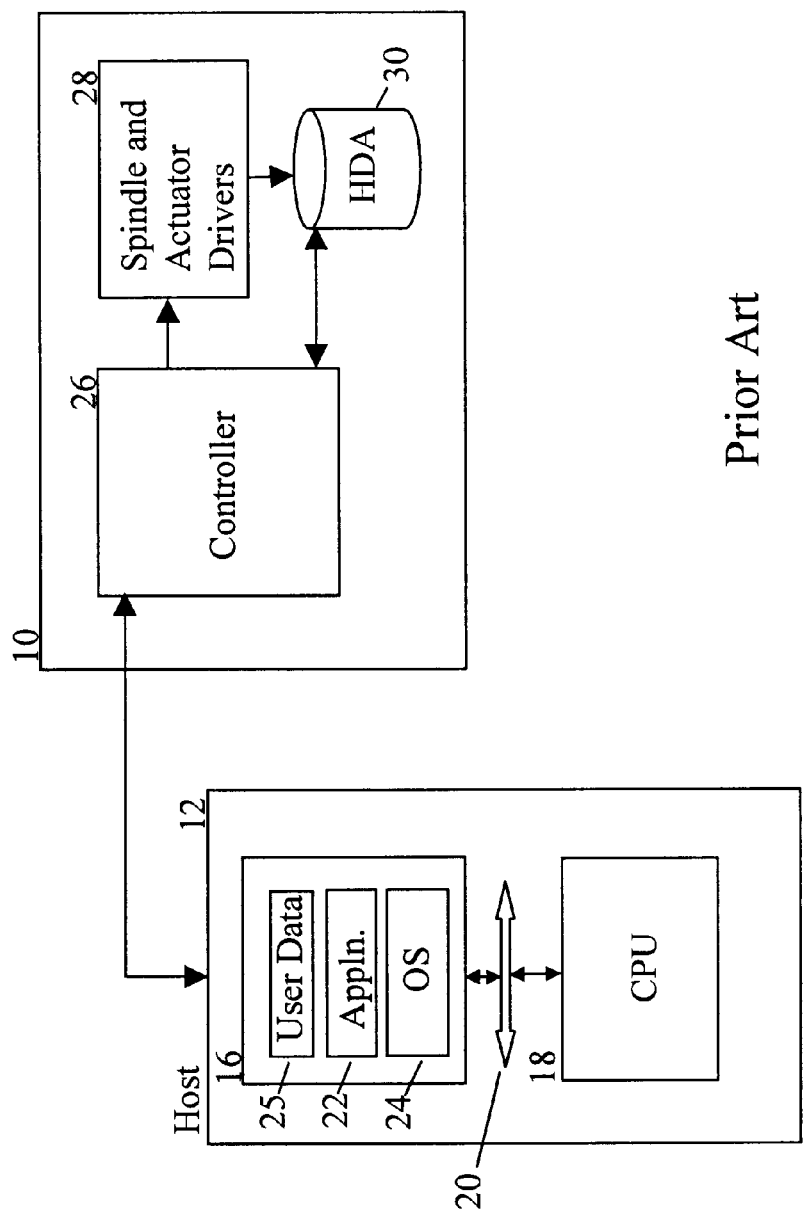
FIG. 1 is a diagram illustrating a conventional host computer system and its hard drive.
Figure 2:
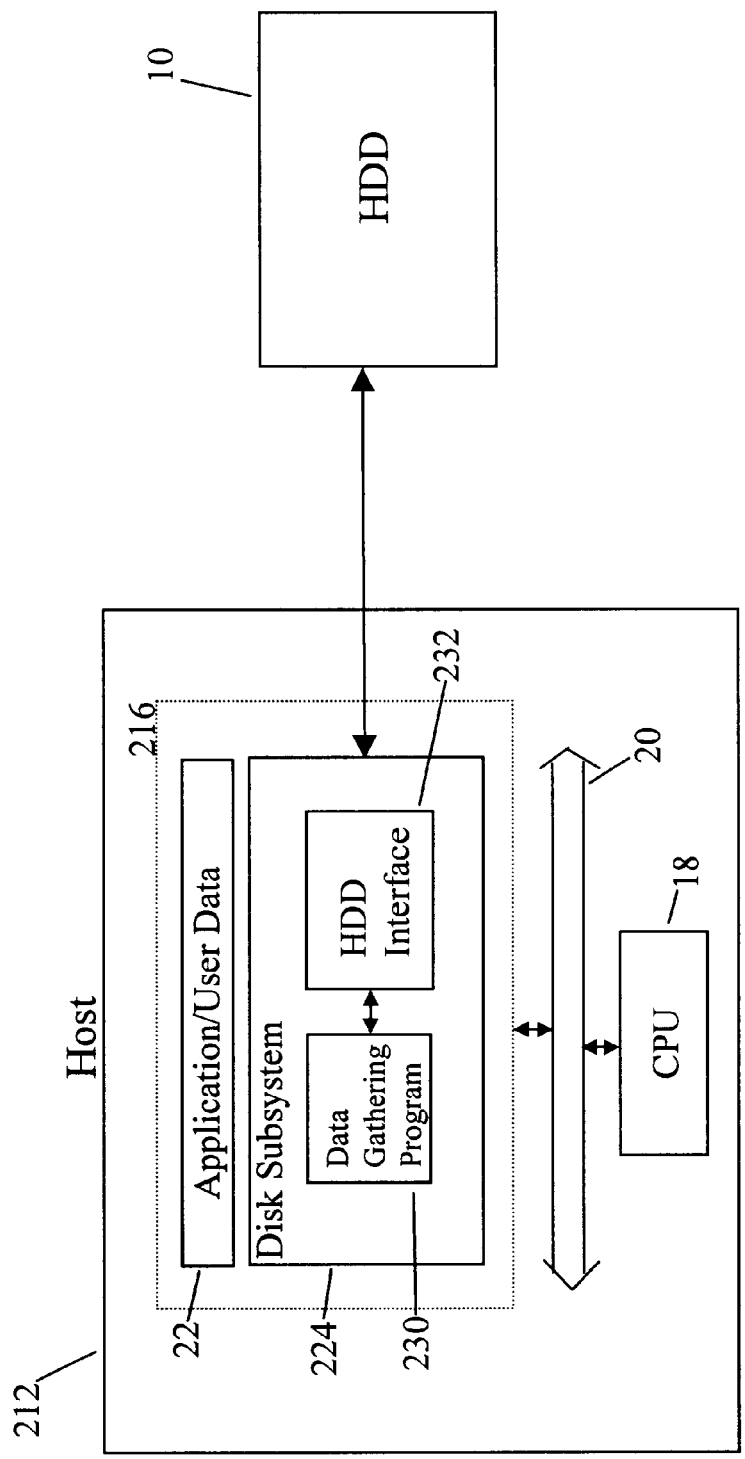
FIG. 2 is a block diagram illustrating hardware and software components of a computer system consistent with the present invention.

FIG. 2 is a block diagram illustrating hardware and software components of a computer system consistent with the present invention. Host computer 212 is similar to computer 12, shown in FIG. 1, except that memory 216 additionally includes a data gathering program 230.

As shown, computer 212 contains a CPU 18, a bus 20, and a solid-state memory 216, which may be, for example, a dynamic random access memory (DRAM). Memory 216 contains a disk subsystem 224 and application or user data 22. Disk subsystem 224, which may be implemented as part of the operating system or separate from the operating system, includes computer instructions implementing a hard disk drive interface 232 and data gathering program 230.

Host computer system 212 stores or reads data to/from the attached hard disk drive 10.

As data is read to and from hard disk drive, it uses data produced by data gathering program 230 to reorder the read and write commands. This may be done to minimize the random movement of the read/write head. Features regarding an embodiment are disclosed in more detail in U.S. Pat. No. 6,490,651, the content of which is hereby incorporated herein in its entirety.

Before describing the operation of data gathering program 230 in more detail, it will be helpful to review the physical geometry of a hard disk drive.

Figure 3A:
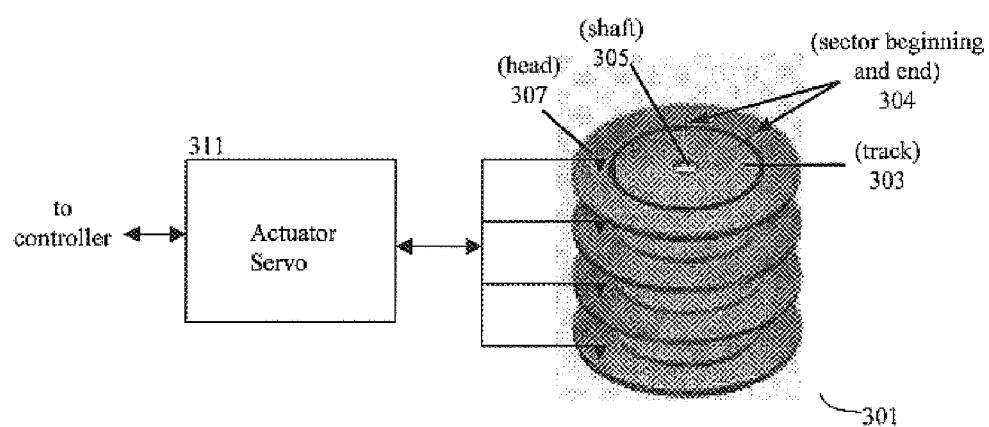
FIG. 3A is a diagram illustrating the arrangement of magnetic platters in a hard disk drive.

FIG. 3A is a diagram illustrating the arrangement of magnetic platters in a hard disk drive. Data in the disk drive is stored on the surface of one or more magnetic platters 301 in concentric tracks 303. Tracks 303 are further divided into sectors 304. In operation, when the disk drive is active, shaft 305, and hence platters 301, are constantly rotated by a motor (not shown). Heads 307, which read and write data to platters 301 by inducing magnetic fields incident on the platters, are positioned just above the platters (e.g., three micro-inches above the platters). Heads 307 are moved to the various tracks 303 on platters 301 by actuator servo 311.

Generally, the physical position of platters 301 relative to heads 307 are not known by host computer 12. For example, when host computer 12 wishes to read data from disk drive 10, it transmits a "logical block address" (LBA) to disk drive 10. The LBA specifies the specific sectors on platters 301 that the host computer 212 would like to read. In response, disk drive 10 moves heads 307 to the appropriate position above platters 301, accesses the disk drive, and returns the requested data. Throughout this read operation, host computer 212 has no need to know, and indeed, disk drive 10 may not have been designed to inform the host computer, of the physical position of heads 307 at any particular instant.

Figure 3B:
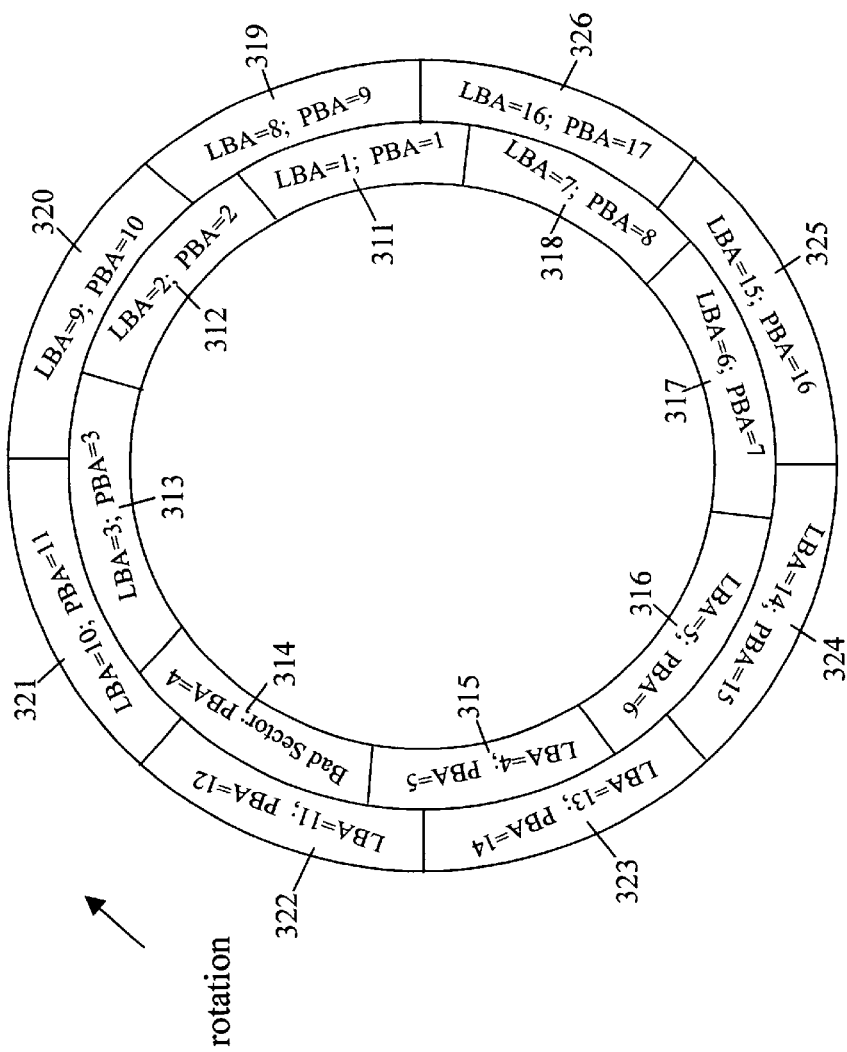
FIG. 3B illustrates two adjacent tracks on a disk platter.

FIG. 3B illustrates two adjacent tracks on a platter. For clarity, each track is shown as having only eight sectors, although in practice tracks usually have many more sectors. The inner track is comprised of the eight sectors labeled 311 through 318, and the outer track is comprised of the eight sectors labeled 319 through 326. Each sector 311 through 326 may hold, for example, 512 bytes of information. Each sector 311 through 326 is associated with a corresponding LBA, which is used by host 212 to address the sector, and PBA (physical block address). LBAs are converted to PBAs by controller 26 of hard disk drive 10.

As shown, sector 311 has an LBA and a PBA of one. Similarly, sectors 312 and 313 have LBAs and PBAs of two and three, respectively. Sector 314, however, is a bad sector. It has a PBA of four but no corresponding LBA. In effect, sector 314 is normally not seen by host 212, as disk drive 10 automatically skips this sector when converting LBAs from host 212 to the appropriate PBAs.

Sector 318 is the last sector in the inner track. The sector after sector 318 is the first sector in the outer track, sector 319. Because disk read and write commands often access multiple consecutive sectors, the beginning of the last sector of the inner track and the first sector of the outer track are offset, or skewed, from one another. By skewing the tracks, the disk drive has time to move its disk head to the next track. If the tracks were not skewed, the disk head would miss the beginning of the first sector of the next track and have to wait for a complete revolution of the platter before beginning to read the sector.

Figure 4:
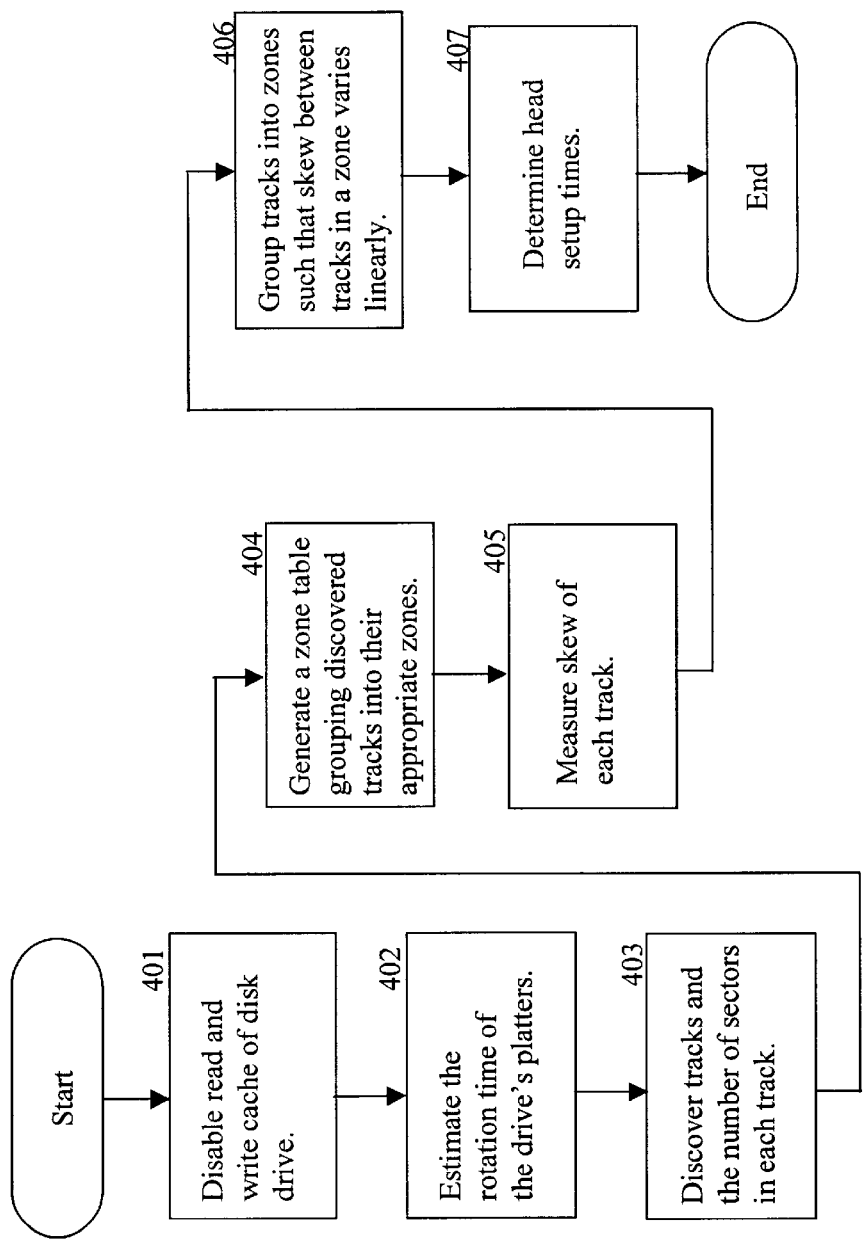
FIG. 4 is a flow chart illustrating the operation of a data gathering program consistent with the present invention.

FIG. 4 is a flow chart illustrating the operation of data gathering program 230. In general, data gathering program 230 collects information about the physical characteristics of disk drive 10 that are normally hidden from the host. The collected physical characteristics include platter rotation time, the number and size of each track, the skew of the tracks relative to one another, and head seek, settle, and setup times.

To begin, the data gathering program preferably disables the read and write cache of disk drive 10. (Act 401). By disabling caching at disk drive 10, read and write commands will cause direct access to the hard disk drive platters 301. If the hard disk drive cache were left on, hard disk drive 10 may fulfill read commands from internal solid state memory. For ATA (advanced technology attachment) disk drives, the "set features" command can be used to disable a drive's cache.

Data gathering program 230 estimates the rotation time of platters 301. (Act 402). The rotation time, as defined herein, is the time for one of platters 301 to make a complete rotation. The rotation time for any particular disk drive is essentially constant. To measure rotation time, data gathering program 230 issues multiple read commands to a particular LBA (e.g., the first LBA, LBA 0), and measures the response time (i.e., the time it takes the command to complete) of the disk drive. The first read is used merely to position the heads at the desired location of the disk, so the response time is discarded. Since cache is disabled, the heads will be positioned just after LBA 0 when the read is complete. By immediately issuing another read command to LBA 0, the drive will have to wait one full revolution so that LBA 0 will once again be positioned beneath the heads for reading. Thus the command execution time for the second read is a direct measure of the rotation speed. Data gathering program 230 performs multiple reads of LBA 0 and takes the average as the time of rotation of the disk drive. Although data gathering program 230 uses LBA 0 to measure the disk rotation time, any LBA should be sufficient to make the same measurement.

As previously mentioned, host computer 212 accesses data in disk drive 10 using LBAs to address the data. Each LBA corresponds to a physical sector in disk drive 10, which in turn is located on one of tracks 303. The LBAs themselves, however, do not indicate which sector 304 or track 303 the addressed data belongs to.

Data gathering program 230 next locates the tracks in disk drive 10. (Act 403). More particularly, the LBA range of each track is determined by issuing a series of double read commands and analyzing the response time of the second read of each double read command. The first read command of each double read command is used to position the drive heads at the beginning of the track. As long as the second read command falls on the same track, increasing the LBA of the second read command will cause a corresponding increase in the response time, since the disk will have to spin more for the requested LBA to be positioned beneath the drive's read head. However, when the LBA of the second read has been increased to the point where that LBAs physical location on the disk is on the subsequent or next track, there will be a noticeable drop in the response time, relative to the preceeding response times. That is because very little rotation time occurs between the first LBA of any track and the first LBA of the successive track. The LBA at which the execution of the second read command falls sharply, relative to the preceeding LBA, is the starting LBA of the succeeding track, and subtracting 1 from that LBA yields the last LBA of the track being analyzed. This track analyzation process is performed one track at a time, from the first track of the disk to the last, and is illustrated in more detail in the flow chart of FIG. 5A.

Figure 5A:
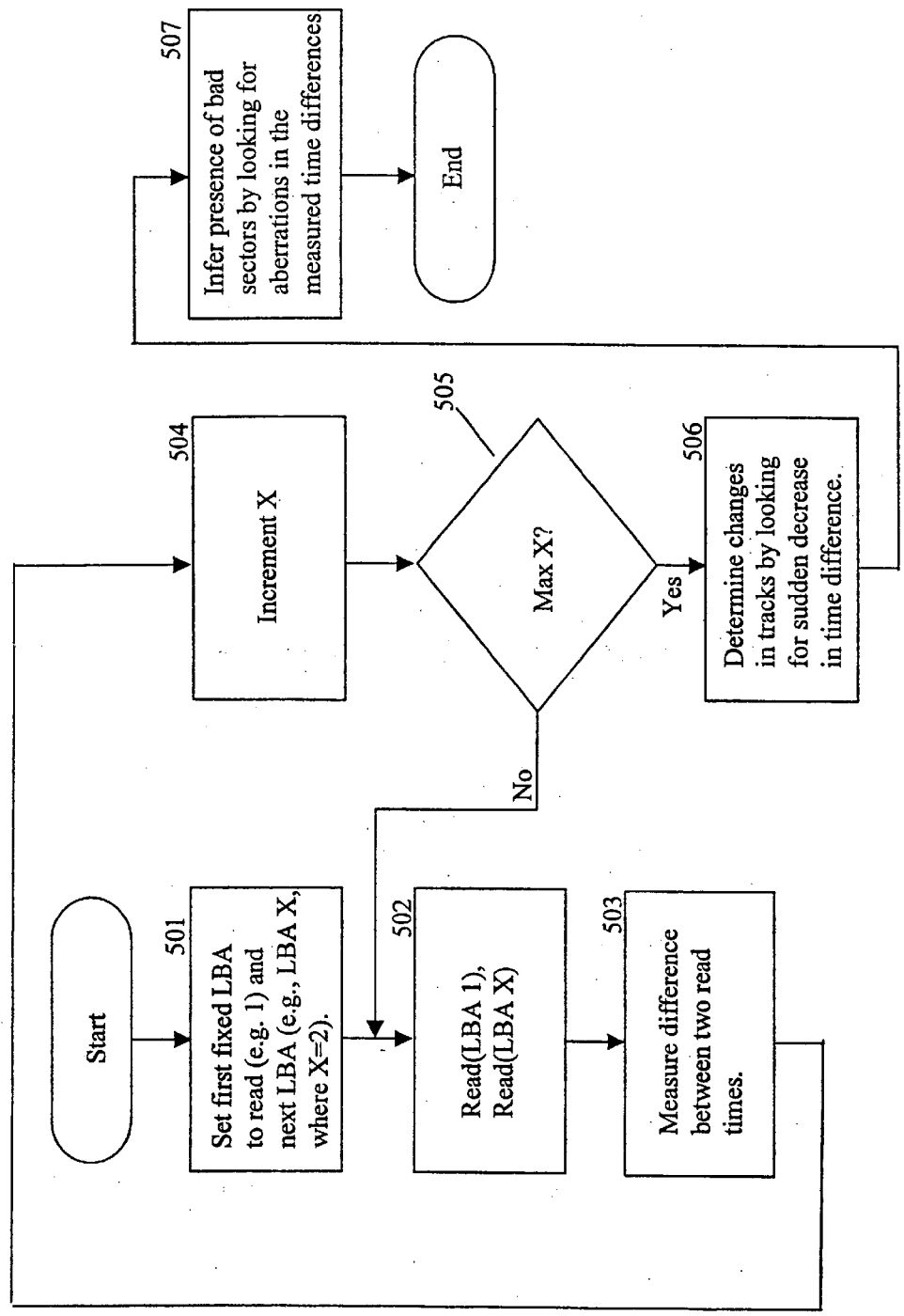
FIGS. 5A and 5B are flow charts illustrating discovery of physical information in a hard disk drive.

As shown in FIG. 5A, data gathering program 230 begins the track determination process by issuing a series of double read commands in which the LBA of the first read is known to be the first LBA of the track being analyzed. Initially, LBA 0 is the only LBA known to be the beginning of a track, so LBA 0 is first used. The LBA of the second read command of the first double read command sequence is 50, but other numbers could be used as well. For the second and succeeding double read commands, the LBA of the second read command is 50 more than the LBA of the second read command of the preceding double read command sequence (ACTS 501 and 502). Table 1A, left column, shows an exemplary sequence of LBAs used on the first track of a disk drive. Data gathering program 230 measures and stores the response times of the second read commands (Act 503). Table 1A, right column, shows exemplary times of the second read commands that could occur on a drive that rotates at 5400 RPM and has 390 sectors per track on the first track. For each double read command sequence in Table 1A, except the first, the LBA of the second read command is increased by 50, causing a corresponding increase in the response time, until the last row, where the response time of reading LBA 400 is lower than the previous response time (LBA 350), (Act 504 and 505). Data gathering program 230 generates a table, such as Table 1A, containing response times of the second read of each double read sequence.

TABLE 1A 390 sectors per track

| Read Command Pair Issued By The Data Gathering Program. | Response Time Of Second Read Commands (ms). |
| --- | --- |
| Read(LBA 0), Read(LBA 50) | 1.42 |
| Read(LBA 0), Read(LBA 100) | 2.84 |
| Read(LBA 0), Read(LBA 150) | 4.26 |
| Read(LBA 0), Read(LBA 200) | 5.68 |
| Read(LBA 0), Read(LBA 250) | 7.10 |
| Read(LBA 0), Read(LBA 300) | 8.52 |
| Read(LBA 0), Read(LBA, 350) | 9.94 |
| Read(LBA 0), Read(LBA, 400) | 1.28 |

Data gathering program 230 locates the LBAs that correspond to physical track changes by parsing the generated data for sudden decreases in completion times. (Act 506). As shown, the decrease in these times occur in Table 1A between the read pair (LBA 0, LBA 350) and (LBA 0, LBA 400). Thus, LBA 400 is considered to be on the next sequential track from the track where LBA 350 is located. However, LBA 400 is not necessarily the beginning of the next track, since the LBA of the second read was being incremented by 50 for each table entry. The reason that the LBA of the second read is incremented by 50 each time is to save time, because there are typically several hundred sectors per track, and incrementing the second LBA by 1 would take much longer to get to the next track. Data gathering program 230 stops adding 50 to the second LBA as soon as it sees a decrease in the response time. For the example in Table 1A, LBA 400 would be the last double read performed using an increase of 50 for the LBA.

Act 507 shows that had sectors may be inferred by looking for aberrations in the measured time difference.

Figure 5B:
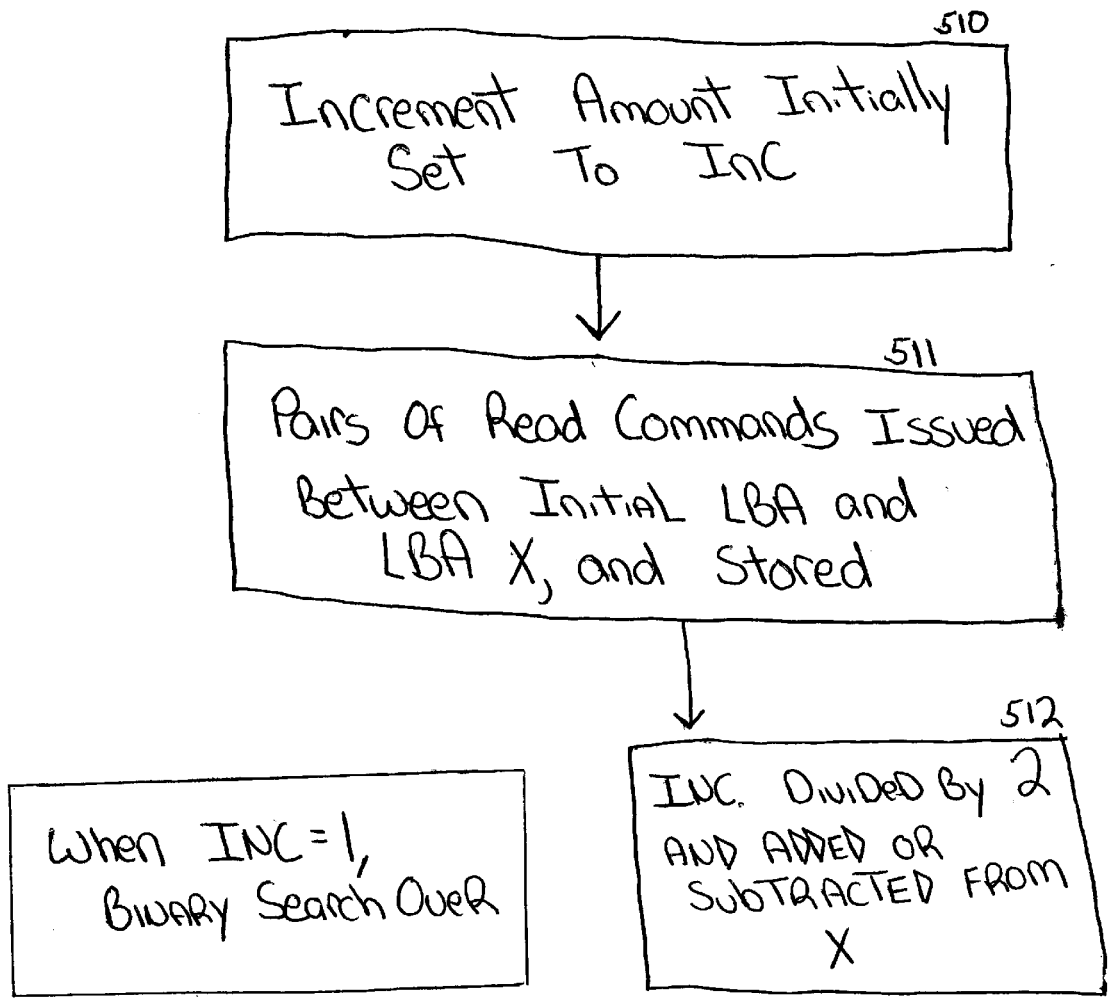

To find the exact LBA which cause a decrease in response time of the second read command, data gathering program 230 uses a binary search method, which is illustrated in FIG. 5B. A linear search method could have been used (LBA 350, LBA 351, LBA 352, etc.) for the LBAs of the second read of the double read sequences, but the binary search method is simple, well known and much faster.

As shown in FIG. 5B, an increment amount is initially set to a number INC (such as 50). (Act 510). Pairs of read commands are then issued between the initial LBA and LBA X, and stored. (Act 511). When INC equals 1, the binary search is over. (Act 503). Otherwise, INC is divided by 2 and added or subtracted from X depending on whether the most recent time was a low value. (Act 512).

Continuing with the example illustrated by Table 1A, Table 1B shows the sequence of double read commands performed by data gathering program 230 using the binary search method. For continuity sake, the last two rows of Table 1A are duplicated in the first two rows of Table 1B. However, those two double read commands are only performed once by data gathering program 230. Column 2 of Table 1B shows how much the second LBA is incremented or decremented for each double read, relative to the previous table entry. Because data gathering program 230 uses a binary search, the amount of the increment or decrement is halved for each new double read. Furthermore, the decision whether to increase or decrease the LBA is based on the response time of the previous double read. If the response time of the previous read is "low", the LBA will be decreased; if the response time is "high", the LBA will be increased. The binary search method stops after a table entry is generated which has either a +1 or −1 in column 2. Data gathering program 230 chooses from the table the row nearest the end having a "low" value for the response time. In that row, the LBA of the second read is chosen as the LBA of the next track. In the case of Table 1B, that would be the row containing LBA 390 as the location of the second read. Since LBA 390 is the starting LBA of the next track. LBA 389 becomes that last LBA of the track being analyzed. At this point, data gathering program 230 is finished with the first track, and begins the track analyzation of the next track using a starting LBA of 390. This repetitive process continues until reading a sector causes an "illegal address" error, which indicates that there are no more tracks to analyze.

TABLE 1B 390 sectors per track

| Read Command Pair Issued By The Data Gathering Program. | Second LBA Adjustment | Response Time Of Second Read Commands (ms). |
| --- | --- | --- |
| Read(LBA 0), Read(LBA, 350) | — | 9.94 |
| Read(LBA 0), Read(LBA 400) | +50 | 1.28 |
| Read(LBA 0), Read(LBA 375) | −25 | 10.68 |
| Read(LBA 0), Read(LBA 387) | +12 | 11.02 |
| Read(LBA 0), Read(LBA 393) | +6 | 1.08 |
| Read(LBA 0), Read(LBA 390) | −3 | 1.00 |
| Read(LBA 0), Read(LBA 389) | −1 | 11.08 |

Tracks in disks drives are typically organized into "zones" in which each track in a particular zone has a fixed number of sectors per track. Tracks closer in to the center of a platter tend to have fewer sectors per track. Based on the information in Tables 1A and 1B, for each track on the hard disk, data gathering program 230 calculates the sectors per track for each track, and then generates a zone table grouping the tracks into their appropriate zones. (Act 404). More specifically, data gathering program 230 organizes consecutive tracks into groups that have the same number of sectors per track. It is possible for some tracks in a zone to have a fewer number of sectors per track than other tracks in the same zone. That can occur if one or more sectors on such a track have been marked as "bad" and are not accessible using any LBA. Another situation that can cause a different number of sectors per track is when one or more sectors is being used as a replacement sector for another sector on the disk drive that has gone bad. Data gathering program 230 handles this situation by looking for consecutive tracks with the same number of sectors per track. So even if there are tracks that have bad or replacement sectors, it continues examining the track data until it finds several tracks with the same number of sectors per track. This number is considered to be the true number of sectors per track. To handle the case where several tracks might contain the same number of bad sectors and thus confuse data gathering program 230 into thinking that those tracks are typical for the zone, a maximum sectors per track count is kept during the entire search for the current zone, and the zone search continues until a set number of consecutive tracks has the same number of sectors per track as the maximum number of sectors per track that has been encountered for the zone.

Table 2A shows a sample sequence of tracks and their associated sectors per track, beginning with track 0 and ending with track 12 If data gathering program 230 is searching for 5 consecutive tracks with the maximum sectors per track, it will not choose the entries for tracks 1 . 5 to determine the sectors per track for zone 0. Instead, data gathering program 230 will examine the entry for track 0 and record the sectors per track (390) as the current maximum value. Then, even though there are 5 consecutive entries (tracks 1–5) with the same sectors per track (389), data gathering program 230 compares 289 with the current maximum value, 390, and continues the search. The entries for tracks 6–10 are examined and found to meet the criteria of 5 consecutive tracks with a sectors per track value (390) equal to the maximum value encountered during the search for the current zone.

TABLE 2A

| Track # | Sectors Per Track |
|---|---|
| 0 | 390 |
| 1 | 389 |
| 2 | 389 |
| 3 | 389 |
| 4 | 389 |
| 5 | 389 |
| 6 | 390 |
| 7 | 390 |
| 8 | 390 |
| 9 | 390 |
| 10 | 390 |
| 11 | 390 |
| 12 | 390 |

By examining the sectors per track for every track in the above fashion, data gathering program 230 creates a zone table similar to the one in Table 2B.

TABLE 2B

| Zone Number | Tracks Included in Zone | Sectors Per Track |
|---|---|---|
| 0 | 0–1207 | 390 |
| 1 | 1208–2413 | 380 |
| 2 | 2414–3620 | 375 |
| 3 | 3621–4827 | 370 |
| 4 | 4828–6034 | 365 |

As previously mentioned, the first sector of each track is physically offset from the last sector of the immediately preceding track in order to give the disk drive enough time to switch to reading the new track without having to wait for the platter to make a complete revolution. This offset is called track skew. In reality, there are two types of track skew—a head skew and a cylinder skew. A head skew is a track skew for a track which follows another track on the same cylinder. Thus, a head skew gives the disk drive time to select a new head in order to read or write a new track on the same cylinder, without moving the arm to which the heads are all attached. A cylinder skew is a track skew for a track which follows the last track of the previous cylinder. Thus, the cylinder skew gives the disk drive time to move the arm to which all the heads are attached, and possibly (for some drives) select a new head in order to read or write a new track on the next cylinder. Since moving the head-arm mechanism and merely selecting a different head are mechanically very different, cylinder and head skews can be very different. A good analogy is found in a CD player capable of playing multiple CDs. Selecting the next song on the same CD takes a much different time than selecting the first song of the next CD. Data gathering program 230 collects all the track skew values and determines what the cylinder and head skew values are. (Act 405).

Data gathering program 230 measures the skew of each track relative to the beginning of the previous track. Skew for each track is determined using a procedure similar to that used in determining the LBA range of each track. That is, data gathering program 230 issues pairs of read commands, the first read command reading data from the first LBA of the previous track, and the second read command reading data from the first LBA of the current track. The completion time of the second read command is the skew of the current track, relative to the previous track. If the drive has trouble reading any of the LBAs, and an extra revolution of the disk drive occurs, data gathering program divides the completion time, modulo the rotation time. Thus, no matter how long the reads take to complete, the position of the start of each track, relative to the previous track, is determined.

Just as distribution of the sectors in each track can be grouped into a sector zone map, the skew patterns of the tracks of the drive may similarly be grouped into skew zones. Although some drives have the same cylinder and head skew throughout the entire drive, other have been found which vary, depending on what range of tracks they belong to. To handle this more general case, data gathering program 230 analyzes the track skews for the entire drive, creating skew zones, or groups of tracks, such that each skew zone has its own independent cylinder skew and head skew. (Act 406). Additionally, each skew zone table entry has its own starting skew, since the first track of a skew zone might not start at exactly the same rotational position as track 0. Within a skew zone, the present inventor has found a simple relationship between the track number and the track skew, such that the skew of any particular track in a zone is given by: zone_starting_skew+(NCYLS*zone_cylinder_skew)+((NTRACKS-NCYLS)* zone_head_skew), where NCYLS is the number of cylinder track boundaries crossed in going from the beginning of the skew zone to the track, and NTRACKS is the number of track boundaries crossed in going from the beginning of the skew zone to the track. Thus, NTRACKS-NCYLS is the number of non-cylinder track boundaries crossed in going from the beginning of the skew zone to the track. Table 3A, below, includes exemplary values of these variables for a very simple drive which has only one cylinder skew, one head skew, and starting skew of 0 on track 0.

TABLE 3A

| Skew Zone | Start Track | Start Skew (ms) | Head Skew (ms) | Cylinder Skew (ms) |
|---|---|---|---|---|
| 0 | 0 | 0 | 1.52 | 1.15 |

Table 3B, below, includes exemplary values of these variables for the more general case where there are more than one skew zone.

TABLE 3B

| Skew Zone | Start Track | Start Skew (ms) | Head Skew (ms) | Cylinder Skew (ms) |
|---|---|---|---|---|
| 0 | 0 | 0 | 1.52 | 1.15 |
| 1 | 7000 | 4.5 | 1.50 | 1.10 |
| 2 | 14000 | 9.0 | 1.50 | 1.10 |
| 3 | 21000 | 2.4 | 1.52 | 1.15 |
| 4 | 28000 | 6.9 | 1.52 | 1.15 |
| 5 | 35000 | 0.3 | 1.50 | 1.15 |
| 6 | 42000 | 4.8 | 1.50 | 1.15 |
| 7 | 49000 | 9.3 | 1.52 | 1.10 |
| 8 | 56000 | 2.7 | 1.52 | 1.10 |

The head and cylinder skews are calculated by examining the skews of the first several tracks of a skew zone. Enough tracks are examined to be sure that there is at least one cylinder track encountered. Then, the head skew is calculated as the simple average of the skews from the non-cylinder tracks, and the cylinder is calculated as the simple average of the skews from the cylinder tracks. Due to slight timing variations induced by the operating system, fluctuations in the drive speed, and round-off errors in calculating the skews, it is likely that the initial skew values will cause more and more "track skew drift," as more and more tracks are examined. "Track skew drift" is the difference between the actual measured skew of a track and the skew that is calculated from the values in the skew zone table. Once the initial skew values for a zone are calculated, data gathering program 230 continues examining more tracks, making small corrections in the skew values as it goes along, until either the end of drive is reached, or the track skew drift exceeds some threshold. In the latter case, the current skew zone is considered complete, and a new skew zone is explored, beginning with the track that exceeded the track skew drift threshold.

As described above, data gathering program 230 obtains the zone table, skew table, rotation speed, number of heads, and the number of hidden sectors on each track. With this information, data gathering program 230 can calculate the cylinder head, sector, and rotational position, relative to LBA 0, of any LBA on the drive. The rotational position of any LBA is calculated as the sum of the skew of the desired track (calculated from the values in the skew table, Table 3B) plus the positional offset between the first LBA of the desired track and the desired LBA. It can also calculate the rotational position of the drive heads at any time by knowing the rotation speed and keeping track of the last known head position and measuring the time elapsed since the last known position.

Data gathering program 230 next creates seek profile tables, which contain the seek plus settle (henceforth referred to simply as seek time) for a variety of different seek lengths, both in the inward and outward directions. (Act 407). Inward seeks go from smaller cylinder numbers to greater numbers. Outward seeks go from greater cylinder numbers to lesser numbers. If the seek times generated for the seek profile tables are too low, then programs that rely on the table to schedule access to an LBA may not perform well because the disk head will settle on the appropriate track after the sector to be accessed has passed the head. In this situation, the head will have to wait nearly a full revolution of the disk platter before accessing the sector. On the other hand, if the seek times in the seek profile tables are too high, the disk head will tend to arrive early and end up waiting for the desired sector to rotate to it, wasting valuable time. Accordingly, to maximize disk drive performance, it is highly desirable to generate accurate seek profile tables. Since seek commands are usually followed by a read or write command, and write commands often take longer to execute due to more stringent settling requirements for the drive heads, data gathering program 230 creates seek-read and seek-write tables, both for the inward and outward directions, for a total of 4 tables.

Each seek table contains 83 entries, corresponding to seek lengths 1,2,3, . . . ,64,100,200,300, . . . ,900, 1000,2000,3000, . . . , 10000. Many other possibilities exist for which seek lengths to use represent the seek tables. A program that requires the seek time for a seek length that is not represented in the table can use linear interpolation for seek lengths less than 10000, and extrapolation for those over 10000. For each seek length, data gathering program 230 performs a sequence of double read commands (or write commands), such that the first command is anywhere on a starting cylinder and the second command is on an ending cylinder at an LBA that is calculated using an estimate of the seek time. For inward seeks with seek length N, the starting and ending cylinders are 0 and N, respectively. For outward seeks, the cylinders are reversed. The head number used is typically 0, but any head number will do. Initially, the estimated seek time is high enough to ensure that the read (or write) will be successful without the drive having to wait for an extra rotation. For each estimated seek time, 25 double reads are performed (other numbers are possible), and a count is recorded of the number of reads (or writes) whose completion times included an extra rotation of the drive platters. As just mentioned, the first guessed seek times will be big enough so that few, if any, extra revolutions will occur. However, as data gathering program 230 decreases the guessed seek time, the percentage (out of the 25 trials) of extra revolutions from the reads (or writes) will increase. This is because the drive is being asked to read from LBAs on the ending cylinder that are positioned too close to where the heads land, so that the heads don't have enough time to settle and become ready to read (or write). By continuing to decrease the estimated seek time, data gathering program 230 will eventually record a consistently high percentage (at or near 100%) of extra revolutions, at which time the percentages for all of the guessed seek times are stored in a table and analyzed. Table 4A, below, shows exemplary percentages of extra revolutions incurred for a seek length of 300. What can be noted is that drive heads and seek mechanics are not perfect, and there is some variation in how much time it takes to move the head-arm mechanism, and some variation in how long it takes the heads to settle and become ready for a read or write. This is the reason for the "% Extra Revolutions" column not jumping from 0 to 100 directly. In other words, there is a range of time over which the heads sometimes have enough time to settle and sometimes not, resulting in a percentage of extra revolutions between 0 and 100. In analyzing the data in Table 4A, data gathering program 230 determines the smallest guessed time that incurs few or no extra revolutions. In this case, that would be 3.45 ms. That number becomes the "worst case"

or safest seek time, because the actual seek time is always less than or equal to 3.45 ms, and programs that use that value to calculate an LBA to read (or write) will most likely not be surprised with an unusually high response time due to an extra revolution. The data gathering program 230 determines the "best care" or least safe seek time by finding the greatest guessed seek time that produces consistently high percentages of missing revolutions. In Table 4A, that would be 2.90. Thus, the actual seek time varies from 2.80 ms to 3.45 ms. Data gathering 230 records the best case and worst case seek times for each seek length in each seek table. If a program were interested in the average seek times, rather than the best or worst case, a simple average of the two should be sufficient.

TABLE 4A

Seek Length = 300

| Guessed Seek Time (ms) | % Extra Revolutions (out of 25) |
|---|---|
| 3.50 | 0 |
| 3.45 | 0 |
| 3.40 | 4 |
| 3.35 | 8 |
| 3.30 | 12 |
| 3.25 | 20 |
| 3.20 | 28 |
| 3.15 | 40 |
| 3.10 | 52 |
| 3.05 | 64 |
| 3.00 | 76 |
| 2.95 | 84 |
| 2.90 | 92 |
| 2.85 | 96 |
| 2.80 | 100 |

Table 4B, below, lists exemplary seek plus settle times (worst case) for inward seek-read lengths between 100 and 1000 cylinders, inclusive.

TABLE 4B

Seek-Read Settle Times

| Seek Distance (cylinders) | Seek Time (ms) |
|---|---|
| 100 | 2.86 |
| 200 | 3.15 |
| 300 | 3.45 |
| 400 | 3.75 |
| 500 | 3.93 |
| 600 | 4.07 |
| 700 | 4.23 |
| 800 | 4.38 |
| 900 | 4.53 |
| 1000 | 4.80 |

With some disk drives, the disk head may need some "setup time" after finishing a read or write before it can again access the disk. The setup time required by the drive may vary depending on the current command (i.e., read or write) and the previous command (i.e., read or write). The setup time may also vary depending on whether current command is on the same track, or on a different track on the same cylinder.

Data gathering program 230 determines head setup times by issuing combinations of read and write commands. (Act 408). More particularly, data gathering program 230 issues combinations of read-read, read-write, write-read, and write-write commands on the same track and on different tracks of the same cylinder. The setup times are determined in a similar manner as the seek settle times (i.e., an estimated guess of the setup time is used, starting with a high value, and gradually decreased until the percentage of extra revolutions is at or near 100%). As before, a best and worst case setup time is determined, which could be used by a program to calculate an average, or used, as is, to guarantee either 100% or 0% extra revolutions, depending on the desire of the program using the data.

As generally described above, a variety of physical parameters of a disk drive can be discovered by a host computer system using basic commands available to an ATA disk drive.

While the invention has been described by way of an exemplary embodiment, it is understood that the words used herein are words of description, rather than words of limitation. Changes may be made, within the purview of the appended claims, without departing from the scope and the spirit of the invention in its broader aspects. Although the invention has been described herein with reference to particular structure, materials, methods, and embodiments, it is understood that the invention is not limited to the particulars disclosed. The invention extends to all equivalent structures, mechanisms, and uses.

What is claimed is:

1. A method of acquiring physical characteristics of a hard disk drive by a host computer system and reordering read and write commands of the host, the method comprising:

issuing pairs of disk read commands, the first read command of each said pair reading data from a fixed logical block address (LBA) and the second real command of each said pair reading data from a variable LBA;

measuring completion times of the second read command in each said issued pair of disk read commands;

locating beginnings of new physical tracks on the hard disk drive by parsing the measured completion times for sudden decreases, the beginnings comprising at least part of disk physical characteristic data; and reordering commands of the host to read and write to the hard disk drive based on the disk physical characteristic data.

2. The method of claim 1, wherein the variable LBA is incremented by a fixed quantity for each successive pair of read commands.

3. The method of claim 1, wherein the variable LBA is incremented or decremented by one half of a previous variable LBA value for each successive pair of real commands.

4. The method of claim 1, wherein the fixed LBA address is the first LBA of a track on the hard disk drive.

5. The computer system of claim 1, further including inferring the quantity of bad, hidden, or spare sectors on each located track based on differences between the number of accessible sectors in the track and the number of sectors calculated from the starting and ending LBAs of the track.

6. The method of claim 4, further including grouping the located physical tracks into zones in which each said zone has an equal number of sectors per track.

7. The method of claim 1, further including disabling cache memory of the hard disk drive before issuing the pairs of disk read commands.

8. The method of claim 1, further including acquiring a rotational speed of the hard drive by sequentially issuing a plurality of read commands to a predetermined LBA, measuring the total response time to all of the plurality of read commands, and dividing the total response time by the number of the plurality of issued read commands.

9. The method of acquiring characteristics of a hard disk drive by a host computer system and reordering read and write commands of the host, the method comprising:

issuing pairs of disk read commands, the first read command of each said pair reading data from an LBA corresponding to the first sector of a track on the hard disk drive, and the second read command of each said pair reading data from an LBA corresponding to a succeeding next track on the hard disk drive;

measuring the completion time of the second read in each said issued pair of disk read commands;

recordering skew values based on the measured completion times;

grouping the recorded skew values into zones such that each zone has a unique starting skew, cylinder skew, and head skew, the recorded skew values and groupings of the recorded skew values comprising at least part of disk physical characteristic data; and reordering commands of the host to read and write to the hard disk drive based on the disk physical characteristic data.

10. The method of claim 9, wherein the first read command of each said pair reads data from an LBA corresponding to a first sector of a track on the hard disk drive.

11. The method of claim 9, further including disabling cache memory of the hard disk drive before issuing the pairs of disk read commands.

12. The method of claim 9, further including acquiring a rotational speed of the hard drive by sequentially issuing a plurality of read commands to a predetermined LBA, measuring the total response time to all of the plurality of read commands, and dividing the total response time by the number of the plurality of issued read commands.

13. A computer system comprising:

a computer readable memory;

a processor of a host computer system, the processor being coupled to the computer readable memory, the processor executing instructions stored in the computer readable memory; and a hard disk drive coupled to the processor through a hard disk drive interface program stored in the computer readable memory;

wherein the computer readable memory additionally stores a data gathering program that, when executed by the processor, issues pairs of disk read commands to the hard disk drive, the first read command of each said pair reading data from a fixed logical block address (LBA) and the second read command of each said pair reading data from a variable LBA; measures the completion time of the second read command in each said issued pair of disk read commands; and locates beginnings of new physical tracks on the hard disk drive by parsing the measured completion times of the read commands for sudden decreases, the beginnings comprising at least part of disk physical characteristic data; and wherein the computer readable memory additionally stores instructions that, when executed by the processor, reorder commands of the host to read and write to the hard disk drive based on the disk physical characteristic data.

14. The computer system of claim 13, wherein the variable LBA is incremented by a fixed quantity for each successive pair of read commands.

15. The method of claim 13, wherein the variable LBA is incremented or decremented by one half of the previous variable LBA value for each successive pair of read commands.

16. The computer system of claim 13, wherein the fixed LBA address is the first LBA of a track on the disk drive.

17. The computer system of claim 13, further including inferring the quantity of bad, hidden, or spare sectors on each located track based on differences between the number of accessible sectors in the track and the number of sectors calculated from the starting and ending LBAs of the track.

18. The computer system of claim 16, further including grouping the located physical tracks into zones in which each track in said zone has an equal number of sectors.

19. The computer system of claim 13, further including disabling cache memory of the hard disk drive before issuing the pairs of disk read commands.

20. The computer system of claim 13, further including acquiring a rotational speed of the hard drive by sequentially issuing a plurality of read commands to a predetermined LBA, measuring the total response time to all of the plurality of read commands, and dividing the total response time by the number of the plurality of issued read commands.

21. A computer readable medium containing computer instructions that when executed by a processor of a host computer system control the processor to perform the method comprising:

the host issuing pairs of disk read commands for reading data from a hard disk drive, the first read command of each said pair reading data from a fixed logical block address (LBA) and the second read command of each said pair reading data from a variable LBA;

the host measuring the completion time of the second read commands in each said issued pair of disk read commands;

the host locating beginnings of new physical tracks on the hard disk drive by parsing the measuring completion times for sudden decreases, the beginnings comprising at least part of disk physical characteristic data; and the host reordering commands of the host to read and write to the hard disk drive based on the disk physical characteristic data.

22. The computer readable medium of claim 21, wherein the variable LBA is incremented by a fixed quantity for each successive pair of read commands.

23. The computer readable medium of claim 21, wherein the variable LBA is incremented or decremented by a quantity one half of the previous variable LBA value for each successive pair of read commands.

24. The computer readable medium of claim 21, wherein the fixed LBA address is the first LBA of a track on the hard disk drive.

25. The computer readable medium of claim 21, wherein the computer instructions additionally infer the quantity of bad, hidden, or spare sectors on each located track based on differences between the number of accessible sectors in the track and the number of sectors calculated from the starting and ending LBA 5 of the track.

26. The computer readable medium of claim 25, wherein the computer instructions additionally group the located physical tracks into zones in which each track of said zone has an equal number of sectors per track.

27. The computer readable medium of claim 21, wherein the computer instructions additionally disable cache memory of the hard disk drive before issuing the pairs of disk read commands.

28. The computer readable medium of claim 21, wherein the computer instructions additionally acquire a rotational speed of the hard drive by sequentially issuing a plurality of read commands to a predetermined LBA, measuring the total response time to all of the plurality of read commands, and dividing the total response time by the number of the plurality of issued read commands.

29. A method of acquiring physical characteristics of a hard disk drive by a host computer system and reordering read and write commands, the method comprising:

issuing sets of disk read commands, the first read command of each said set reading data from a given LBA, and the second read command of each said set reading data from another LBA;

measuring the completion times of the second read in each said issued set of disk read commands in relation to the completion times of the first read;

determining physical location information corresponding to the given LBA and the another LBA based on the measured completion times, the physical location information comprising at least part of disk physical characteristic data; and reordering commands of the host to read and write to the hard disk drive based on the disk physical characteristic data.

30. A method of acquiring physical characteristics of a hard disk drive by a host computer system and reordering read and write commands, the method comprising:

issuing disk read commands comprising a given read command resulting in reading data from a given LBA, and another read command resulting in reading data from another LBA;

determining a given reference time of reading of data from the given LBA and determining another reference time of reading of data from the another LBA;

determining information representing a physical location of the another LBA in relation to the given LBA based on the determined another reference time in relation to the determined given reference time, the information comprising at least part of disk physical characteristic data; and reordering commands of the host to read and write to the hard disk drive based on the disk physical characteristic data.

31. The method of claim 30, wherein the given read command and the another read command collectively comprise a set of read commands in sequence.

32. The method of claim 31, further comprising issuing a plurality of sets of read commands.

33. The method of claim 30, wherein the given LBA and the another LBA are the same.

34. The method of claim 30, wherein the reference time comprises a completion time.

35. The method of claim 30, wherein a data gathering program measures and stores the another reference time of the another read command in relation to the given reference time of the given read command.

36. The method of claim 30, further comprising:

repeating the issuing disk read commands, the determining the given reference time, and the determining information until the physical location of each LBA on a track of a disk of the hard disk drive has been determined.

37. The method of claim 30, further comprising:

repeating the issuing disk read commands, the determining the given reference time, and the determining information until the physical location of each LBA on a disk has been determined.

38. The method of claim 37, wherein the information representing the physical location of the another LBA in relation to the given LBA comprises a head skew for a track of the disk.

39. The method of claim 38, wherein the information representing the physical location of the another LBA in relation to the given LBA comprises a cylinder skew for a pair of consecutive disks of the hard disk drive.

40. A method acquiring physical characteristics of a hard disk drive by a host computer system and reordering read and write commands, the method comprising:

issuing disk read commands comprising a given read command resulting in reading data from a given LBA, and another read command resulting in reading data from another LBA;

determining a given reference time of reading of data from the given LBA and determining another reference time of reading of data from the another LBA;

determining information representing a physical location of the another LBA in relation to the given LBA based on the determined another reference time in relation to the determined given reference time;

generating a skew zone wherein the skew zone comprises a group of consecutive tracks with a similar head skew and a similar cylinder skew, the information and skew zone comprising at least part of disk physical characteristic data; and reordering commands of the host to read and write to the hard disk drive based on the disk physical characteristic data.

41. The method of claim 40, wherein the information representing the physical location of the another LBA in relation to the given LBA comprises a seek profile table comprising a set of seek times corresponding to a set of seek lengths.

42. The method of claim 41, wherein the set of seek lengths comprises at least one outward seek length and at least one inward seek length.

43. A method of determining a number of LBAs on a given track of a disk and reordering read and write commands of a host comprising:

issuing disk read commands comprising a given read command resulting in reading data from a given LBA, and an another read command resulting in reading data from another LBA;

determining a given reference time of the reading of data from the given LBA and determining an another reference time of reading data from the another LBA;

determining information representing a physical location of the another LBA in relation to the given LBA based on the determined another reference time in relation to the determined given reference time;

repeating the issuing disk read commands, the determining the given reference time, and the determining information until the physical location of each LBA on the given track is determined;

using the physical location of each LBA to determine the number of LBAs on the given track, the information and the number of LBAs comprising at least part of disk physical characteristic data; and reordering commands of the host to read and write to the hard disk drive based on the disk physical characteristic data.

44. The method of claim 43, further comprising:

entering the number of LBAs on the given track into a zone table.

45. The method of claim 43, further comprising:

repeating the issuing disk read commands, the determining the given reference time, the determining information, the repeating, and the using the physical location for each track of the disk;

entering the number of LBAs corresponding to each track of the disk into a zone table; and placing a number of consecutive tracks that have a constant number of LBAs per track into a zone.

46. The method of claim 45, further comprising:

identifying a quantity of bad sectors per the given track by comparing the number of LBAs for the given track to a determined maximum sectors per track number.

47. The method of claim 43, wherein the given read command and the another read command collectively comprise a set of read commands in sequence.

48. The method of claim 44, further comprising issuing a plurality of sets of read commands.

49. The method of claim 43, wherein the reference time is a completion time.

50. An apparatus capable of acquiring physical characteristics of a hard disk drive by a host computer system and recording read and write commands of a host, the apparatus comprising:

a mechanism to issue read commands comprising a given read command resulting in reading data from a given LBA, and another read command resulting in reading data from another LBA;

a mechanism to determine a given reference time of reading of data from the given LBA and determining another reference time of reading data from another LBA; and a mechanism to determine information representing a physical location of the another LBA in relation to the given LBA based on the determined another reference time in relation to the determined given reference time, the information comprising at least part of disk physical characteristic data; and reordering commands of the host to read and write to the hard disk drive based on the disk physical characteristic data.

51. The apparatus of claim 50, wherein the given read command and the another read command collectively comprise a set of read commands in sequence.

52. The apparatus of claim 50, wherein the given LBA and the another LBA are the same.

53. The apparatus of claim 50, wherein the reference time comprises a completion time.

54. The apparatus of claim 50, further comprising a data gathering mechanism to measure and store the another reference time of the another read command in relation to the given reference time of the given read command.

* * * * *